(12) United States Patent
Roderick et al.

(10) Patent No.: US 11,712,664 B2
(45) Date of Patent: Aug. 1, 2023

(54) FLOW SEPARATORS FOR SPIRAL WOUND ELEMENTS

(71) Applicant: Aqua Membranes, Inc., Albuquerque, NM (US)

(72) Inventors: Kevin Roderick, Albuquerque, NM (US); Rodney Herrington, Albuquerque, NM (US); Kendall Weingardt, Albuquerque, NM (US)

(73) Assignee: Aqua Membranes, Inc., Albuquerque, NM (US)

(*) Notice: Subject to any disclaimer, the term of this patent is extended or adjusted under 35 U.S.C. 154(b) by 40 days.

(21) Appl. No.: 17/281,913

(22) PCT Filed: Oct. 29, 2019

(86) PCT No.: PCT/US2019/058652
§ 371 (c)(1),
(2) Date: Mar. 31, 2021

(87) PCT Pub. No.: WO2020/092430
PCT Pub. Date: May 7, 2020

(65) Prior Publication Data
US 2021/0379536 A1    Dec. 9, 2021

Related U.S. Application Data

(60) Provisional application No. 62/752,870, filed on Oct. 30, 2018, provisional application No. 62/752,860, (Continued)

(51) Int. Cl.
*B01D 63/10*    (2006.01)

(52) U.S. Cl.
CPC ...... *B01D 63/103* (2013.01); *B01D 2313/086* (2013.01); *B01D 2313/143* (2013.01)

(58) Field of Classification Search
CPC ............ B01D 63/103; B01D 2313/086; B01D 2313/143; B01D 2313/08; B01D 63/10; B01D 2313/14; B01D 2313/146; B01D 65/003; B01D 69/10; B01D 69/12; B01D 2313/10; B01D 2313/23; B01D 2325/08; B01D 2311/04; B01D 2311/06; B01D 2313/19
See application file for complete search history.

(56) References Cited

U.S. PATENT DOCUMENTS 4,765,893 A * 8/1988 Kohlheb ............. B01D 63/103
                                              210/321.83
4,814,079 A    3/1989 Schneider
(Continued)

FOREIGN PATENT DOCUMENTS

WO    WO2017/105345    6/2017

*Primary Examiner* — Pranav N Patel
(74) *Attorney, Agent, or Firm* — V Gerald Grafe

(57) ABSTRACT

In embodiments of the present invention, flow dividing strips are used in the construction of the spiral wound element to segregate and direct feed to reject flow of a reverse osmosis element Flow dividing strips isolate the flow of fluid through distinct regions of the spiral-wound element. The flow dividing features can also be used to direct flow within the element in order to create a longer flow path for the fluid through the element, enabling even higher recovery in some applications.

23 Claims, 12 Drawing Sheets

Related U.S. Application Data filed on Oct. 30, 2018, provisional application No. 62/752,852, filed on Oct. 30, 2018.

(56) References Cited

U.S. PATENT DOCUMENTS

| | | |
|---|---|---|
| 4,834,881 A | 5/1989 | Sawada |
| 2002/0162784 A1 | 11/2002 | Kohlheb |
| 2013/0146532 A1 | 6/2013 | Dontula |
| 2013/0334128 A1* | 12/2013 | Takagi ................. B01D 65/003 210/457 |
| 2013/0341264 A1 | 12/2013 | Kidwell |

* cited by examiner

FLOW SEPARATORS FOR SPIRAL WOUND ELEMENTS

Cross-reference to Related Applications

This application is a national stage application under 35 U.S.C. 371 of PCT application PCT/US2019/058652, filed 29 Oct. 2019, which claims priority to U.S. provisional applications 62752852, filed 30 Oct. 2018; 62752860, filed 30 Oct. 2018, and 62752870, filed 30 Oct. 2018. Each of the foregoing is incorporated by reference herein.

FIELD OF THE INVENTION

The subject invention relates to a membrane or filtration system utilized for the separation of fluid components, specifically spiral-wound membrane elements.

DESCRIPTION OF THE RELATED ART

Spiral-wound membrane filtration elements generally comprise a laminated structure comprised of a membrane sheet sealed to or around a porous permeate carrier which creates a path for removal, longitudinally to the axis of the center tube, of the fluid passing through the membrane to a central tube, while this laminated structure is wrapped spirally around the central tube and spaced from itself with a porous feed spacer to allow axial flow of the fluid through the element. Traditionally, a feed spacer is used to allow flow of the feed fluid, some portion of which will pass through the membrane, into the spiral wound element and allow reject fluid to exit the element in a direction parallel to the center tube and axial to the element construction.

An alternate design of a spiral wound element allows for the feed-to-reject stream to flow in the same longitudinal direction of the spiral wound membrane as the permeate flow, either from the outside of the spiral to the center, or from the inside of the spiral to the outside. Such a design requires a specially prepared divided center tube to allow two separate flow paths, and also requires that both axial ends of the element are fully sealed to create the longitudinal flow path, rather than the axial path, parallel to the center tube, which is traditionally employed in spiral-wound elements. This alternate design of an element can be advantageous in providing an increased flow velocity and fluid shear within the feed-to-reject stream when compared to the traditional cross-flow design. Increased flow velocity can be beneficial for the prevention of organic and inorganic fouling of the membrane and feed spacer, as well as reducing concentration polarization within the element as fluid passes through the membrane. Examples of such elements are those manufactured by Pentair Corporation under the trade name GRO.

Plastic mesh, which has been traditionally used as a feed spacer for spiral-would elements has also been used in membrane elements employing both axial and longitudinal flow. Spacer mesh typically is manufactured with the strands oriented at 90° from one another, and the mesh is oriented within the membrane diagonally in relation to fluid flow such that the axis of the strands is +/−45° from the direction of fluid flow. Some mesh spacers may employ different angles of the strands from one another, but within a spiral-wound element will still generally be oriented such that the strands are symmetrically diagonal to the direction of fluid flow.

In both axial and longitudinal flow elements, while the flow of fluid progresses mainly in the direction from the feed or inlet region to the reject or outlet of the element, the use of a mesh spacer allows for, and induces, some flow and fluid communication in the direction perpendicular the bulk flow. Similarly, diffusion can occur in all dimensions due to the continuous fluid region created by the constrained flow between the membrane leaves separated by the mesh spacer. In longitudinal flow elements, since the mesh allows for flow in all directions, the ends of the element must be sealed to prevent axial flow and to direct longitudinal flow. This is typically done by applying adhesive to the ends of the spiral wound element after it is rolled.

MODES FOR CARRYING OUT THE INVENTION AND INDUSTRIAL APPLICABILITY

In embodiments of the present invention, strips of material are deposited onto at least one surface of a filtration membrane sheet designed for use in a longitudinal flow spiral-wound element, in the feed flow space, before the membrane is rolled into a longitudinal flow spiral-wound element. The strips, which are substantially impervious to fluid flow in at least one dimension, can be printed or deposited onto each membrane sheet or leaf and prevent fluid flow between regions separated by the strips, directing flow within the region between the strips, and defining the height of the feed space by physically separating the adjacent membrane sheets. The region between the strips can include additional spacing or mixing promoting elements including mesh spacer or printed or deposited features, or it can be left empty to allow free fluid flow, so long as the strips prevent the flow of fluid between adjacent regions on either side of the strips.

In longitudinal flow elements, the strips can be deposited onto the active surface of one half of a membrane leaf, opposite the film from the permeate carrier such that when the leaf is folded, the strips contact the opposite side of the membrane leaf creating a barrier to flow through the strip while defining flow paths between adjacent strips. The strips can be disposed continuously along the edges of the surface of the membrane leaf nearest to the inlet and outlet of the central collection tube and extending longitudinally the length of the membrane leaf from the collection tube to the distal edge of the membrane leaf. The strips act to prevent fluid flow in the direction perpendicular to the strips and parallel to the central collection tube.

Additional strips can be added between the edge strips to further direct and segregate flow in the feed-to-reject stream. A plurality of strips can be deposited or printed to divide fluid flow within the element into distinct regions, for example to prevent mineral or biological growth in one region from spreading to adjacent regions, thereby limiting the spread of fouling within the element. Strips can also be non-linear in shape, and can have protrusions in order to create an extended fluid flow path when compared to straight-through flow.

The spacing between segments separated by additional strips does not have to be uniform. As an example, the strips can remain parallel or at least nonintersecting to allow fluid flow. In some embodiments, the thickness of the strips is the same to maintain a consistent feed space. In general, the flow can be divided into any number of segments with different widths and the flow within each segment will be consistent.

Figure 1:
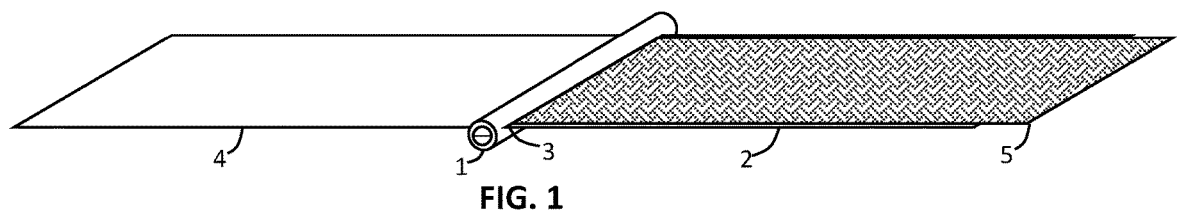
FIGS. 1-3 show the basic construction of a longitudinal flow spiral-wound element before rolling employing flow directing edge spacing strips.
Figure 2:
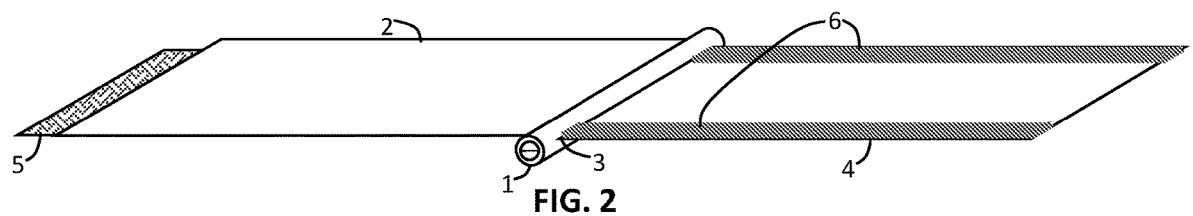
Figure 3:
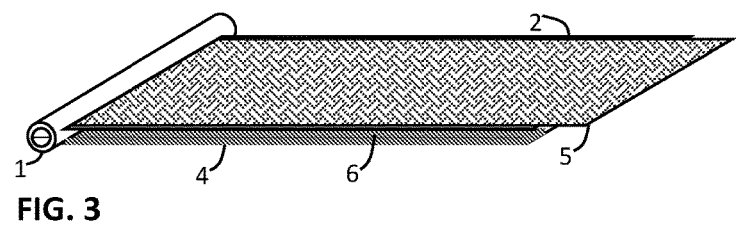

FIGS. 1-3 depict one construction technique for a longitudinal flow spiral-wound element, and one example embodiment of the present invention. FIG. 1 shows a central divided collection tube 1 incorporating a slit 3 through which one half of a membrane leaf 2 passes through. The permeate carrier 5 also passes through the slit and extends outward on one side of the membrane leaf. FIG. 2 shows the same construction flipped vertically. One half of the membrane leaf 2 still passes through the slit, but on the other, active half of the membrane sheet 4, strips 6 are located along the edges that will define the feed-to-reject flow path when the element is rolled. FIG. 3 show the leaf folded as it would be in preparation for element rolling. A glue line can be deposited on top of the permeate carrier around three sides in order to create an envelope sealed on those three sides and in communication with the central slit. The strips can be deposited on either side of the central collection tube, so long as they are on the active side of the membrane leaf, which will be separated by the membrane leaf from the permeate carrier when the element is rolled.

Figure 4:
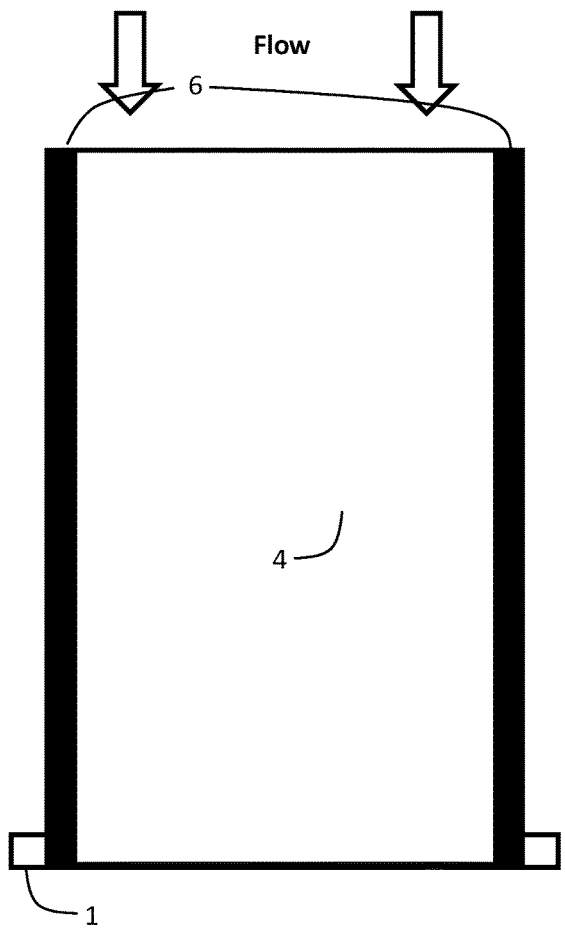
FIG. 4 shows a top view of an unrolled longitudinal flow spiral-wound element employing a solid flow directing edge spacing strip.
Figure 5:
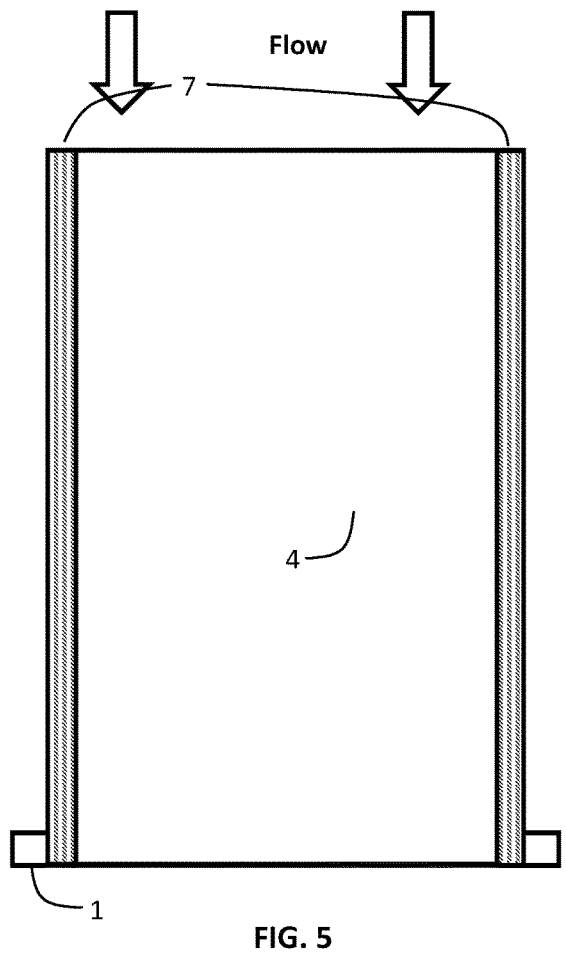
FIG. 5 shows a top view of an unrolled longitudinal flow spiral-wound element employing a flow directing edge spacing strip comprised of multiple parallel lines.
Figure 6:
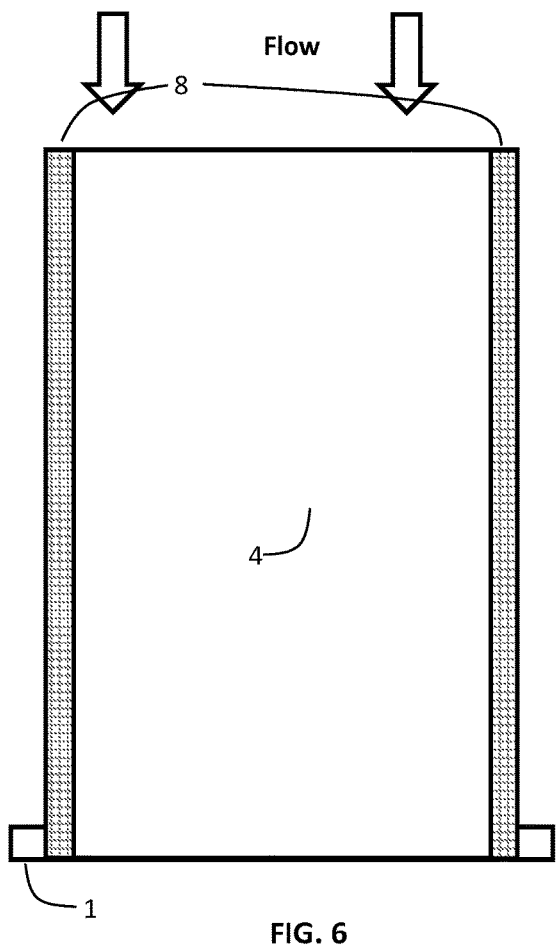
FIG. 6 shows a top view of an unrolled longitudinal flow spiral-wound element employing a flow directing edge spacing strip comprising a net-like structure.

The geometry of the strips can comprise various shapes. In one example embodiment, shown in FIG. 4, the strips are comprised of monolithic solid pieces 6 deposited on the active side of the membrane leaf 4. In one embodiment, shown in FIG. 5, the strips are comprised of sets of parallel lines 7. In another embodiment, shown in FIG. 6, the strips are comprised of net-like features 8. Various other simple or complex shapes can be employed so long as the shape contains at least one continuous section from one end to the other in the direction perpendicular to the axis of the center tube. Many additional shapes and patterns can be employed, providing that they are continuous such that they block axial flow along the length of the edges of the rolled element. Shapes that are not solid throughout the entirety of their dimensions can be preferable in some embodiments in order to use less material in their construction.

Figure 7:
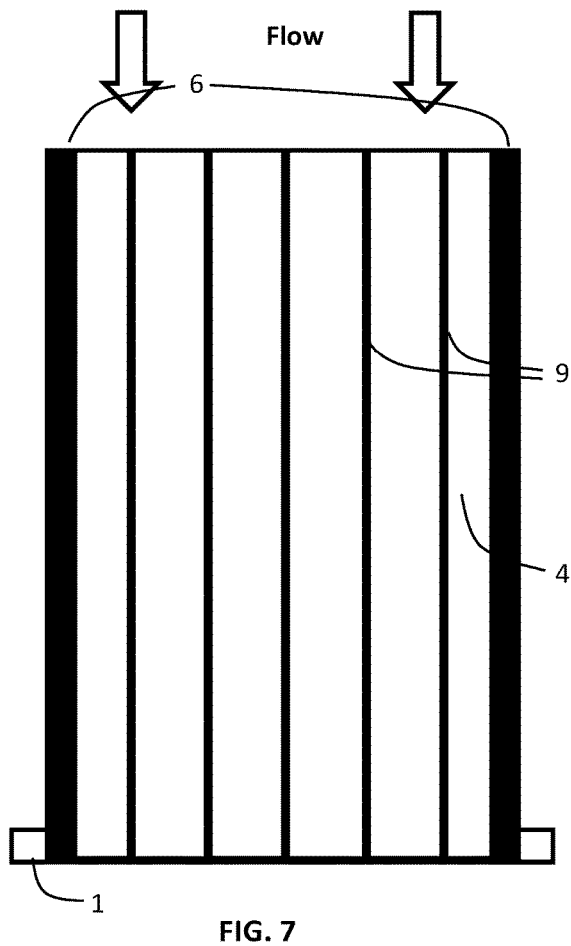
FIG. 7 shows a top view of an unrolled longitudinal flow spiral-wound element employing a solid flow directing edge spacing strip and additional straight flow separating strips.
Figure 8:
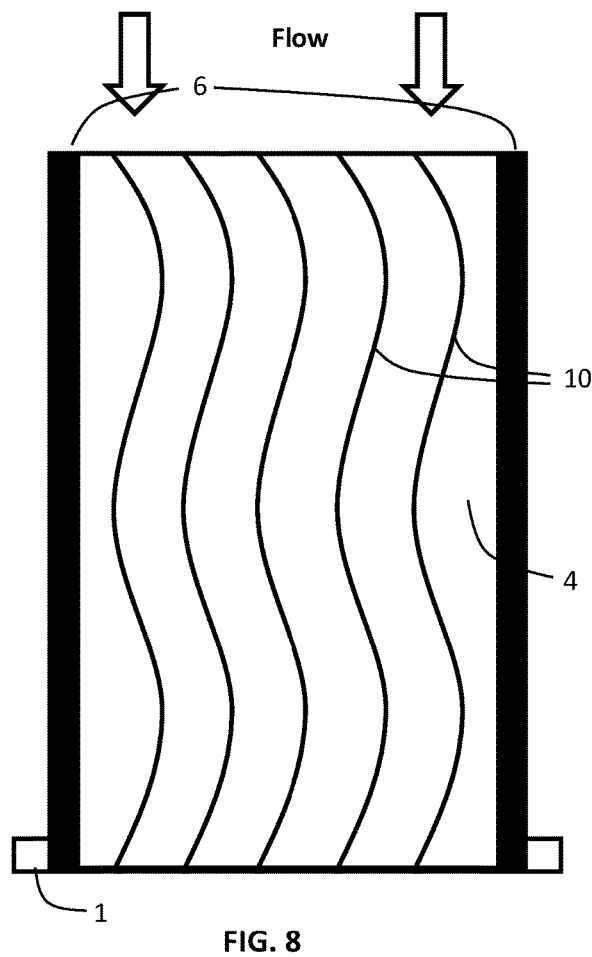
FIGS. 8 & 9 show a top view of an unrolled longitudinal flow spiral-wound element employing a solid flow directing edge spacing strip and additional sinusoidal flow separating strips.
Figure 9:
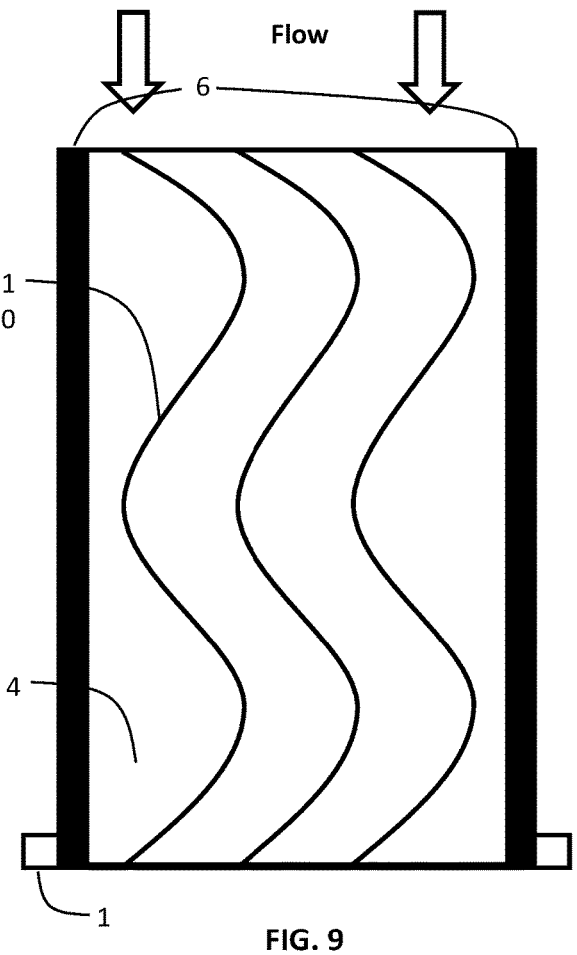

Additional longitudinal strips can be added between the edge strips in order to further channel or direct flow. In one example embodiment, shown in FIG. 7, additional straight strips 9 (in the example 5 additional strips are shown) are disposed between the edge strips 6 in order to direct flow into six distinct regions. Other example embodiments, shown in FIGS. 8-9, illustrate two possibilities of sinusoidal shapes 10 that are used to direct fluid flow while increasing the fluid flow path by making the fluid traverse a longer distance than a straight line between the inlet and outlet. Other shapes, including zig-zag patterns or other non-linear patterns can also increase the length of the fluid flow path while separating flow into distinct regions.

Figure 10:
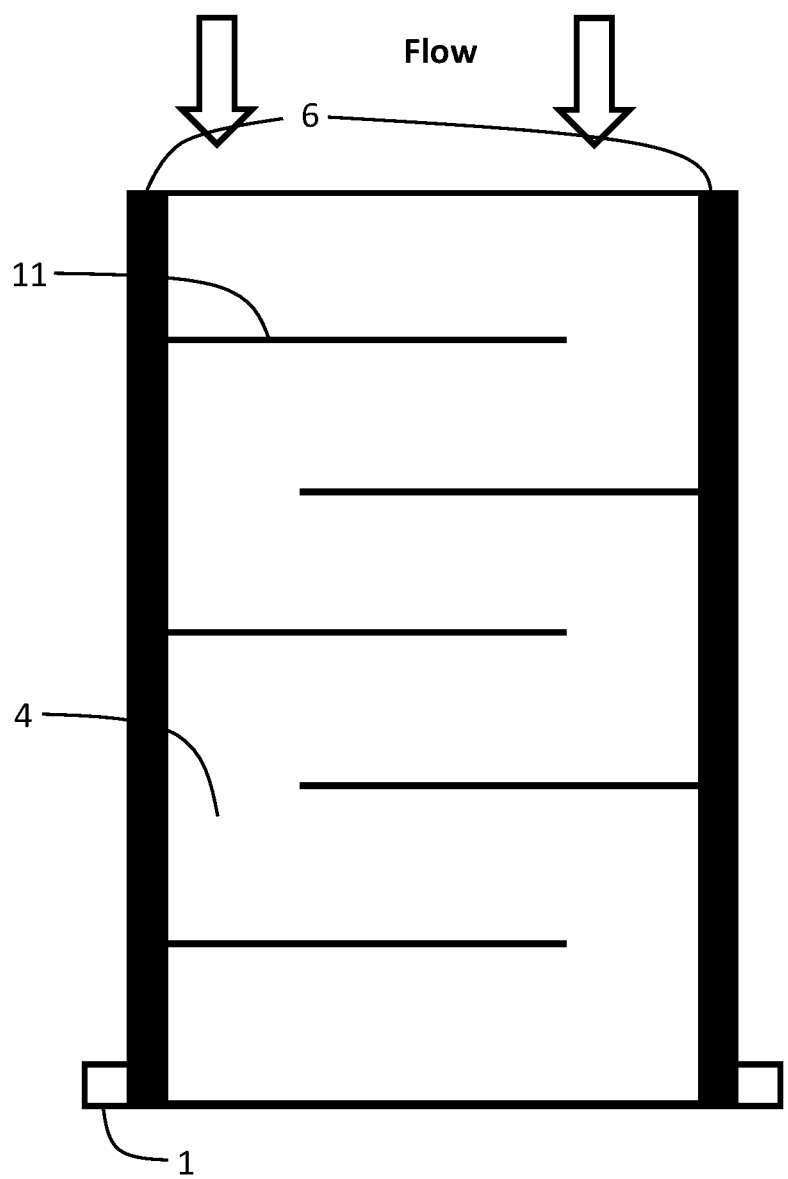
FIG. 10 shows a top view of an unrolled longitudinal flow spiral-wound element employing a solid flow directing edge spacing strip and additional inward facing extensions which increase the flow path length of the fluid in the flow channel.

Another example embodiment shown in FIG. 10 employs inward facing extensions 11 of the edge strips 6 which direct fluid flow in order to lengthen the flow path within the element. Lengthening the fluid flow path can be advantageous for mass transfer or for other element performance considerations. Inward facing extensions can be straight or curved to provide for the desired flow path characteristics.

The strips can comprise any of various materials that are compatible with the separated fluid and the permeate carrier including, but not limited to, thermoplastics, reactive polymers, waxes, or resins. Additionally, materials that are compatible with the separated fluid but not compatible with direct deposition to the permeate carrier, including, but not limited to high-temperature thermoplastics, metals, or ceramics, can be pre-formed, cast, or cut to the proper dimensions and adhered to the surface of the permeate carrier with an adhesive that is compatible with the permeate carrier.

The strips can be applied to the membrane surface by a variety of techniques. Traditional printing techniques such as offset printing, gravure printing, stencil printing and screen printing, can be suitable, although there can be thickness and geometry limitations with these deposition techniques. Thicker features can be deposited by microdispensing, inkjet printing, fused deposition, or via application using an adhesive that can include roll transfer of sheet or pick-and-place of individual features.

Figure 11:
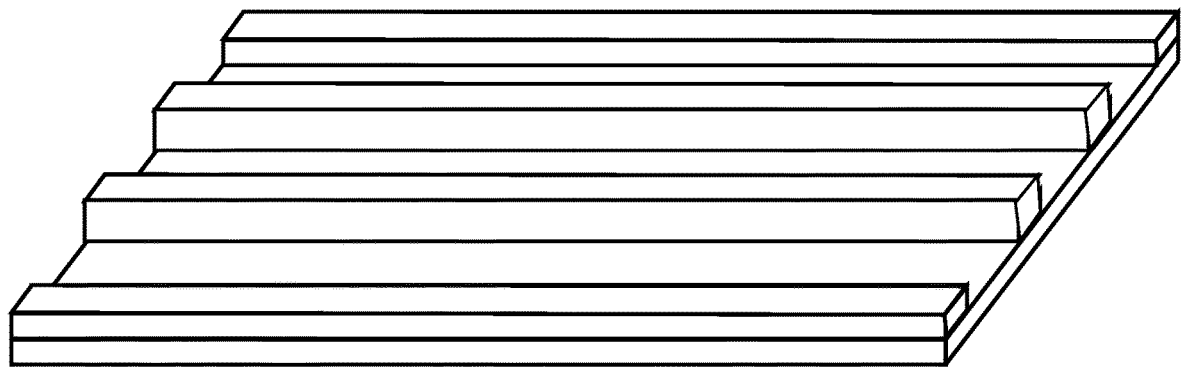
FIG. 11 is a schematic illustration of an example embodiment with strips having different thicknesses.
Figure 12:
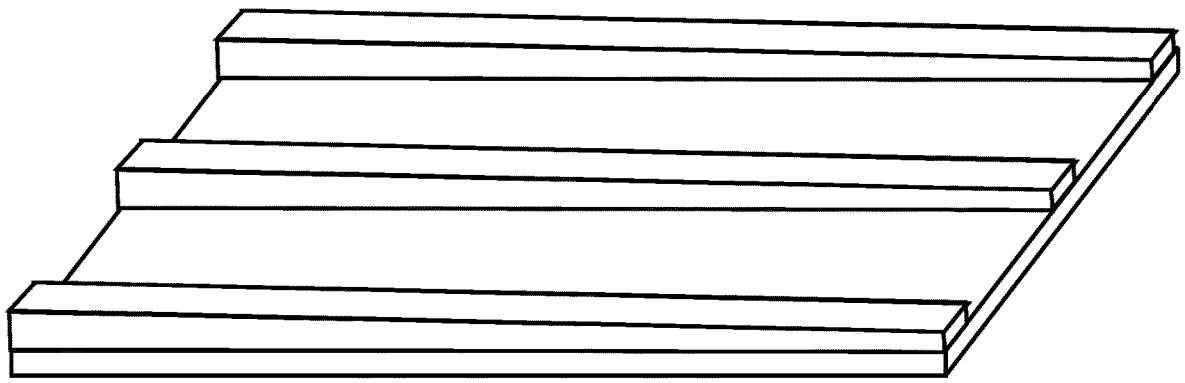
FIG. 12 is a schematic illustration of an example embodiment with strips having tapering thicknesses.

For ease of illustration, the strips in the various figures are shown as having a consistent thickness, or height above the membrane. A strip can also have a thickness that varies along its length. For example, a strip can be thickest at the end of the membrane distal from the collection tube, then taper towards the end closest the collection tube, as shown in FIG. 12. The taper can be linear with position along the length of the membrane, or can comprise various discrete steps in thickness, or can conform to a thickness profile that matches a desired performance (e.g., curved to match feed fluid volume reduction as fluid is transferred across the membrane to the permeate side, or to match desired flow or pressure characteristics). Each strip can have the same thickness, or same thickness profile (where the thickness profile is the thickness of the strip as a function of position along the length of the membrane), as other strips. The strips can also have different thicknesses, or thickness profiles. For example, thicker strips can form thicker feed flow channels, while thinner strips form thinner feed flow channels; mixing thicker strips with thinner strips can provide feed flow channels of varying thickness, providing a plurality of feed flow performance characteristics in a single spiral wound membrane, as shown in FIG. 11 where the two strips in the middle area of the membrane are thicker along their entire length than the two strips near the edge of the membrane. If strips of different thickness are used, the strips can be configured in a spiral or other path down the length of the membrane such that, when the membrane is spirally wound about the collection tube, the overall diameter of the spirally wound element is still consistent (e.g., by routing the strips such that thicker strips overlay thinner strips in adjacent layers of the element when spirally wound). As another example, placing thicker strips near one edge of the membrane and thinner strips near the opposite edge can result in a spirally wound element with a diameter that is lesser near the edge with the thinner strips than near the edge with the thicker strips, providing an overall shape that can be desirable for some applications. Other arrangement of strip thickness can provide other shapes, e.g., hourglass or barrel shaped elements.

The strips can also have varying width, e.g., by varying the width of the strips along their length the width of the feed flow channel can be varied. The varied width can be used, for example, to provide for desired mass flow, or fluid velocity characteristics.

In example embodiments of the present invention, strips of material are deposited onto at least one surface of a filtration membrane sheet, in the feed flow space, before the membrane is rolled into a spiral-wound element. The strips, which are substantially impervious to fluid flow in at least one dimension, can be printed or deposited onto each membrane sheet or leaf and prevent fluid flow between regions separated by the strips, directing flow within the region between the strips, and defining the height of the feed space by physically separating the adjacent membrane sheets. The region between the strips can include additional spacing or mixing promoting elements including mesh spacer or printed or deposited features, or it can be left empty to allow free fluid flow, so long as the strips prevent the flow of fluid between adjacent regions on either side of the strips.

In a typical spiral-wound element design the strips can be deposited onto the active surface of one half of the membrane leaf, opposite the film from the permeate carrier such that when the leaf is folded, the strips contact the opposite side of the membrane leaf creating a barrier to flow through the strip while defining flow paths between adjacent strips Multiple strips can be employed in order to divide inlet to outlet fluid flow within the element into distinct regions. Dividing flow into distinct regions can prevent mineral or biological growth in one region from spreading to adjacent regions, thereby limiting the spread of fouling within the element. In an example embodiment, a central strip divides the element into two sections; in other example embodiments, multiple strips can be placed in order to divide flow within the element into multiple sections, such as tens of sections or more. In such an arrangement, if mineral or biological growth begins in a single section, its growth will be restricted to within that section, allowing continued fluid flow and filtration efficiency within the remaining sections.

The spacing of the strips from one another does not have to be uniform. In some embodiments, the strips remain parallel and the thickness of the strips is the same, which allows the flow to be divided into any number of multiple sections with different widths and the flow within each section will be consistent.

Strips can also be discontinuous, creating gaps between the individual sections to allow fluid flow, but when discontinuous strips are employed it can be advantageous for preventing spread of fouling if the length of the discontinuous strip segments is greater than the distance between adjacent strips.

Figure 13:
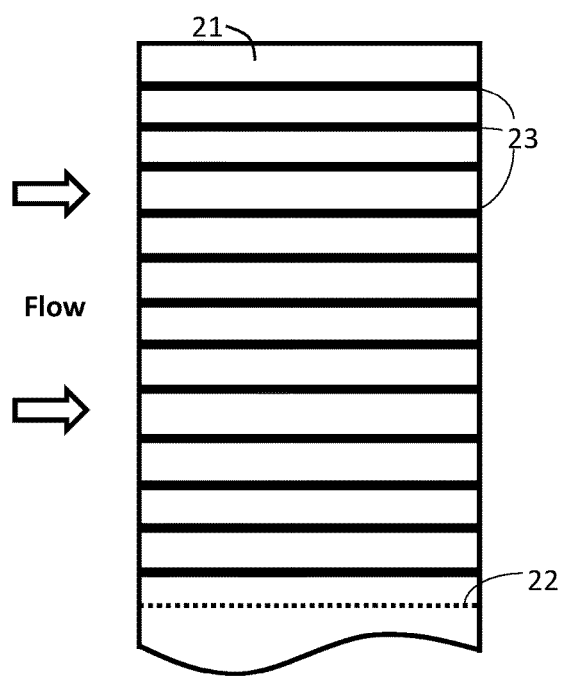
FIG. 13 depicts one half of a membrane leaf with a series of parallel and equally spaced continuous strips deposited onto the membrane surface
Figure 14:
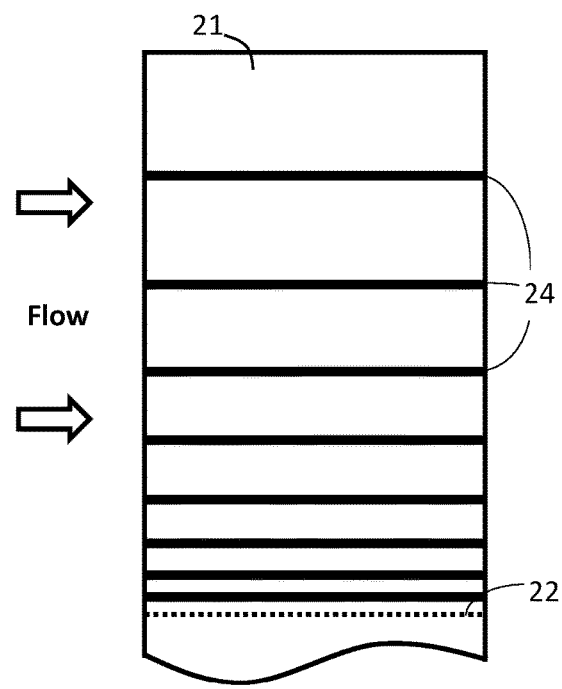
FIG. 14 depicts one half of a membrane leaf with a series of parallel and unequally spaced continuous strips deposited onto the membrane surface

In one example embodiment, the flow separating strips are continuous from the inlet to the outlet and are disposed such that they create segregated areas of flow where no fluid communication occurs between fluid flow regions divided by the strips. These strips are uniform in thickness from inlet to outlet. FIG. 13 depicts an example embodiment comprising a membrane having a series of parallel and equally spaced continuous strips 23 deposited on one half of the active side of a membrane leaf 21 defined by the central fold line 22. In another example embodiment, shown in FIG. 14, a series of parallel but unequally spaced continuous strips 24 are used to divide flow into discrete unequal regions.

Strips can also be non-linear in shape, or can have protrusions in order to create an extended fluid flow path when compared to straight-through flow. For instance, parallel sinusoidal or zig-zag shaped strips can provide consistent flow through each segment, as will strips with equivalent flow directing protrusions.

Figure 15:
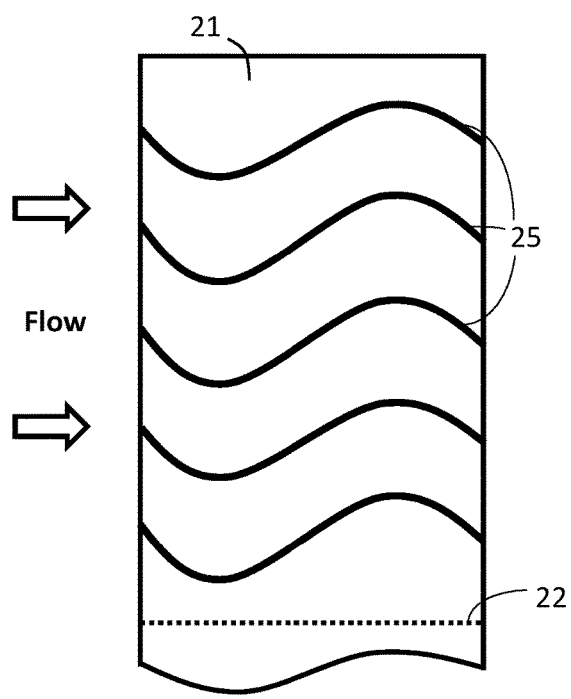
FIG. 15 depicts one half of a membrane leaf with a series of parallel and equally spaced sinusoidal continuous strips deposited onto the membrane surface
Figure 16:
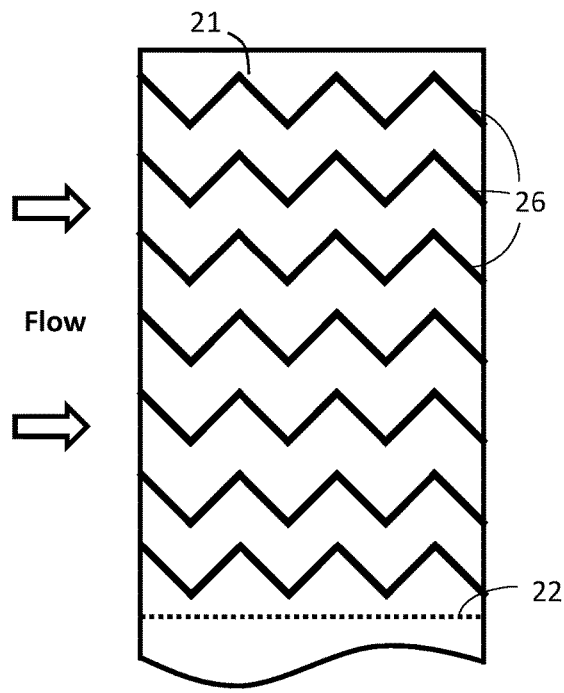
FIG. 16 depicts one half of a membrane leaf with a series of parallel and equally spaced zig-zag shaped continuous strips deposited onto the membrane surface

FIGS. 15-16 show example embodiments having spacer strips that define a more circuitous fluid flow path from inlet to outlet, one example in FIG. 15 using a sinusoidal pattern 25, and another example in FIG. 16 having a zig-zag pattern 26.

Figure 17:
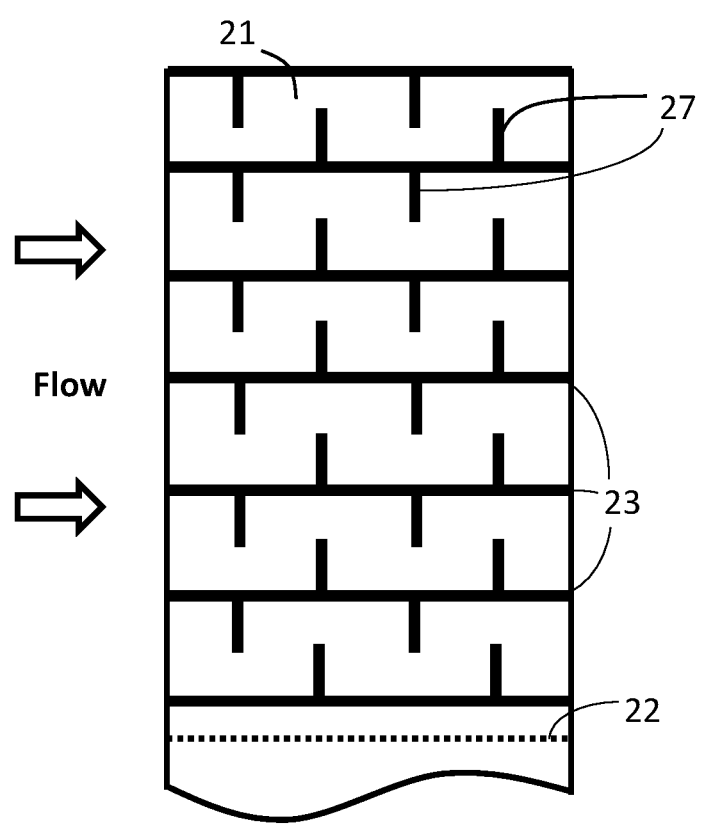
FIG. 17 depicts one half of a membrane leaf with a series of parallel and equally spaced continuous strips with inward facing extensions deposited onto the membrane surface.

An example embodiment which creates a more circuitous fluid flow path involves inward facing extensions 27 of the strips extending from the flow separating strips 23 shown in FIG. 17 (where "inward facing" means inward into the flow path defined by the strips). Lengthening the fluid flow path can be advantageous in some applications to various aspects of separation element performance. Inward facing extensions can be combined with equal spaced strips as in FIG. 17, and can also be combined with unequally spaced strips, and with other strip shapes such as sinusoidal and zig-zag. The extensions can be straight as shown, and can comprise various shapes to provide desired flow characteristics.

Figure 18:
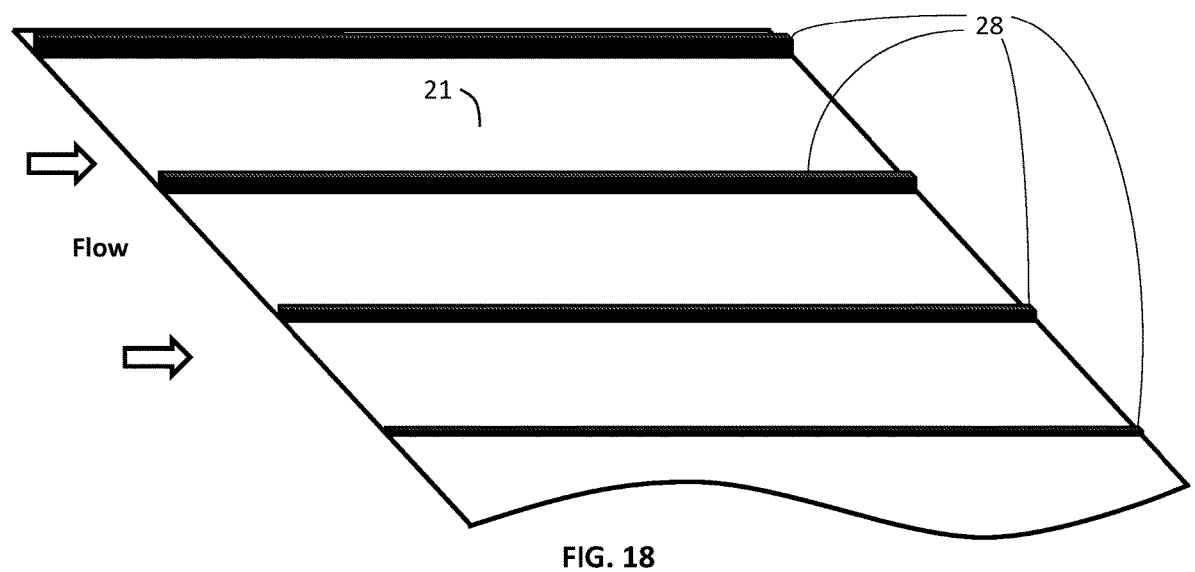
FIG. 18 depicts one half of a membrane leaf with a series of parallel strips of unequal thickness deposited onto the membrane surface.

Adjacent strips can be all the same thickness to provide uniform flow within the element, or they can vary in thickness, in order to create regions of differing feed space in different portions of the spiral-wound element. In one example embodiment, shown in FIG. 18, strips 28 of varying thickness are deposited on the membrane sheet 21 in order to create regions of differing feed flow height within the element. Varying the feed space in such a way alters fluid flow within the various divided regions and can be used to tailor flow within distinct regions of the element, which can be beneficial in some applications, for example for improved mass transfer or fouling mitigation.

Figure 19:
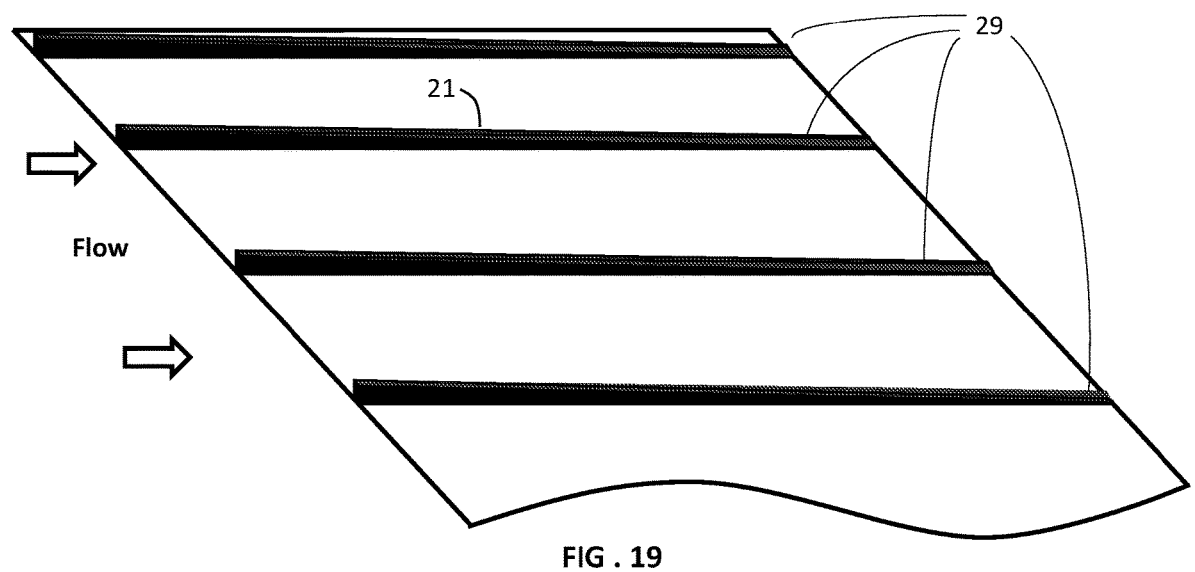
FIG. 19 depicts one half of a membrane leaf with a series of parallel strips having varying thickness along their length deposited onto the membrane surface.

The continuous strips also can vary in thickness axially, providing gradation in thickness from one end of the element to the other in the direction of feed to reject flow. In an example embodiment, shown in FIG. 19, this is shown as a reduction of thickness of the strips 29 from the feed inlet to the reject outlet. Reduction in thickness from feed inlet to reject outlet can be useful in some applications because the volumetric flow in this path is reduced as some portion of the separated fluid passes through the membrane into the permeate stream. By reducing the thickness, the flow velocity within the feed-to-reject stream can be kept at a more constant velocity than without thickness gradation in the strips. Varying the thickness in the axial dimension with a conventional permeate carrier mesh can require that the membrane leaves to be curved in order for the element to roll up into an element with a truncated conical shape. As an alternate example, a permeate carrier that varies in thickness in an opposite and complementary dimension from the feed spacing strips can be employed in order to allow the element to roll normally into a cylindrical shaped element. Strips can have thickness that varies linearly as shown, and can also have thicknesses that vary in discrete steps, according to other profiles (where "profile" refers to the thickness as a function of position along the length of the strip) such as to maintain mass flow to exactly match fluid passing through the membrane to the permeate carrier. Strips with varying thickness profiles can have matching profiles, and can have distinct profiles, e.g., to provide flow paths with distinct flow paths each with its own feed space height profile (formed by the combination of the two strips forming the edges of the flow path).

Figure 20:
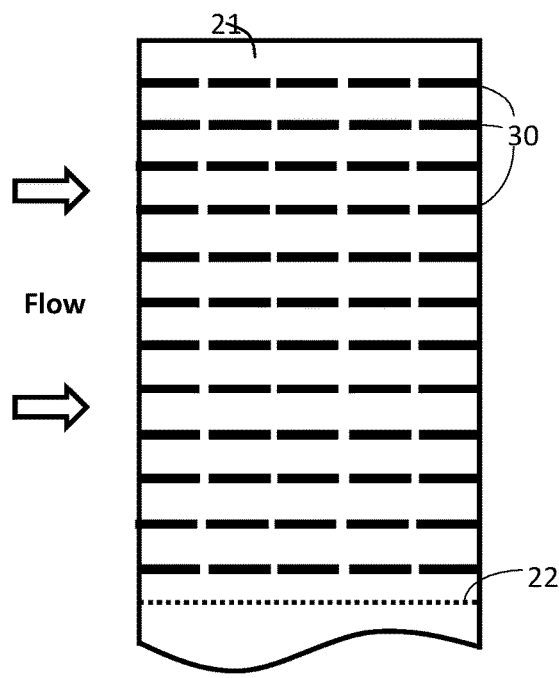
FIG. 20 depicts one half of a membrane leaf with a series of parallel and equally spaced discontinuous strips deposited onto the membrane surface
Figure 21:
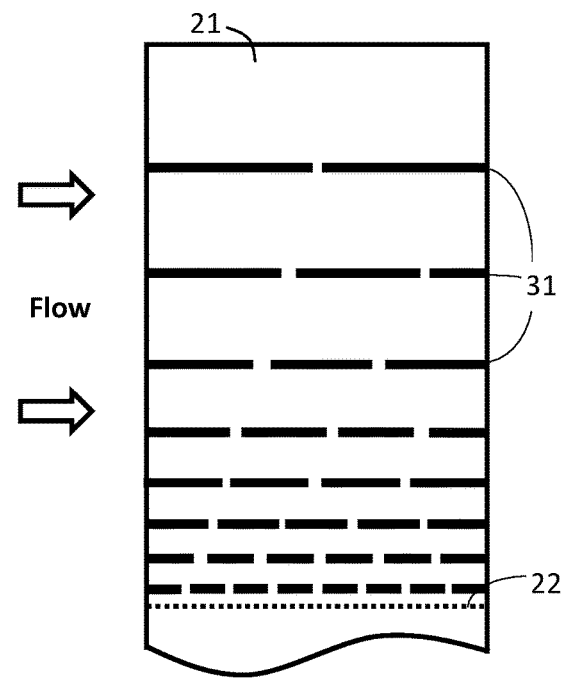
FIG. 21 depicts one half of a membrane leaf with a series of parallel and unequally spaced discontinuous strips deposited onto the membrane surface

In one example embodiment, flow separating strips are discontinuous from the inlet to the outlet and are disposed such that they create segregated areas of flow where fluid communication is limited to specific regions created by gaps between discontinuous segments of the strips. FIG. 20 depicts an example embodiment comprising a membrane having a series of parallel and equally spaced discontinuous strips 30 deposited on one half of the active side of a membrane leaf 21 defined by the central fold line 22. The length of the discontinuous segments is greater the spacing between adjacent discontinuous strips. The discontinuities in each strip can be spaced identically to adjacent strips, or can be staggered with respect to adjacent strips. In another example embodiment, shown in FIG. 21, a series of parallel but unequally spaced discontinuous strips 31 are used to divide flow into discrete unequal regions. In this embodiment the length of each discontinuous strip segment in a given strip is longer than the distance between the discontinuous strips adjacent to it on either side.

The strips can comprise any of a number of materials that are compatible with the separated fluid and the membrane including, but not limited to, thermoplastics, reactive polymers, waxes, or resins. Additionally, materials that are compatible with the separated fluid but not compatible with direct deposition to the membrane, including, but not limited to high-temperature thermoplastics, metals, or ceramics, may be pre-formed, cast, or cut to the proper dimensions and adhered to the surface of the permeate carrier with an adhesive that is compatible with the permeate carrier.

The strips can be applied to the membrane surface by a variety of techniques. Traditional printing techniques such as offset printing, gravure printing, stencil printing and screen printing, can be suitable, although there are thickness and geometry limitations with these deposition techniques. Thicker features can be deposited by microdispensing, inkjet printing, fused deposition, or via application using an adhesive that can include roll transfer of sheet or pick-and-place of individual features.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

What is claimed is:

1. A spiral wound membrane element comprising,
   (a) a central collection tube having a first set of openings along its length to receive permeate flow;
   (b) at least one filtration envelope extending outwardly from and wound about said central collection tube, said at least one filtration envelope comprising two layers of membrane sheet and a permeate carrier layer sandwiched between said layers of membrane sheet; said permeate carrier layer being in direct fluid communication with the first set of openings of said central collection tube;
   (c) at least one feed spacing layer providing feed spacing adjacent the at least one filtration envelope, wherein each of the at least one feed spacing layer contains feed spacing strips attached to a surface of the membrane sheet opposite the permeate carrier layer, said feed spacing strips are in continuous contact with adjacent membrane sheets in either the axial direction or the longitudinal direction, wherein each of the feed spacing strips has a thickness profile and wherein at least one of the feed spacing strips has a thickness profile that reflects a nonconstant thickness of said at least one of the feed spacing strips.

2. The spiral wound element of claim 1, wherein each of the feed spacing strips has a thickness profile and wherein at least one of the feed spacing strips has a thickness profile that is different from the thickness profile of another one of the feed spacing strips.

3. The spiral wound element of claim 1, wherein each of the feed spacing strips has a thickness profile and wherein at least one of the feed spacing strips is characterized by a path other than a straight line parallel to or perpendicular to the axis of the tube.

4. The spiral wound element of claim 1, wherein the spiral wound element is a longitudinal flow spiral wound element, and wherein said central collection tube has a second set of openings, and wherein the at least one feed spacing layer is in direct fluid communication with the second set of openings, and wherein the spacing strips are continuous in the longitudinal direction.

5. The spiral wound element of claim 4, wherein the feed spacing strips are printed onto or otherwise deposited along the edges of the surface of the first membrane surface perpendicular to the central collection tube, defining edges of and preventing axial flow into or out of the feed spacing layer, while defining a path for longitudinal flow in the at least one feed spacing layer when the at least one filtration envelope is rolled into a spiral wound element.

6. The spiral wound element of claim 4, wherein each of the feed spacing strips has a thickness profile and wherein at least one of the feed spacing strips has a thickness profile that is different from the thickness profile of another one of the feed spacing strips.

7. The spiral wound element of claim 4, wherein at least one of the feed spacing strips is characterized by a path other than a straight line parallel to or perpendicular to the axis of the tube.

8. The spiral wound element of claim 1, wherein the spiral wound element is an axial flow spiral wound element, and wherein the feed spacing strips are continuous in the axial direction.

9. The spiral wound membrane element of claim 8 wherein the feed spacing strips are printed onto or otherwise deposited on the surface of the membrane sheet opposite the permeate carrier layer, defining separate regions of axial fluid flow and preventing fluid flow between adjacent segments in the at least one feed spacing layer when the at least one filtration envelope is rolled into a spiral wound element.

10. The spiral wound element of claim 8, wherein each of the feed spacing strips has a thickness profile and wherein at least one of the feed spacing strips has a thickness profile that is different from the thickness profile of another one of the feed spacing strips.

11. The spiral wound element of claim 8, wherein at least one feed spacing strip is characterized by a path other than a straight line parallel to or perpendicular to the axis of the tube.

12. The spiral wound element of claim 8, wherein the feed spacing strips are printed onto or otherwise deposited on the surface of the first membrane surface, defining separate regions of axial fluid flow in the at least one feed spacing layer such that a fluid entering the at least one feed spacing layer must traverse a circuitous path rather than flow directly axially through the at least one feed spacing layer and preventing longitudinal fluid flow between adjacent segments when the at least one filtration envelope is rolled into a spiral wound element.

13. The spiral wound element of claim 8, wherein at least one of the feed spacing strips is characterized for at least part of its length by one of the following: a sinusoidal path, a zig-zag path, a line along a direction non-parallel to the tube.

14. The spiral wound element of claim 8, wherein at least one of the feed spacing strips comprises a base portion and one or more projections extending along the membrane away from the base portion and toward an adjacent feed spacing strip.

15. The spiral wound element of claim 14, wherein the projections and at least one of the feed spacing strips form a comb-like configuration.

16. A spiral wound membrane element comprising,
(a) a central collection tube having an axis and having a first set of openings along its length to receive permeate flow;
(b) at least one filtration envelope extending outwardly from and wound about said central collection tube, said at least one filtration envelope comprising two layers of membrane sheet and a permeate carrier layer sandwiched between said layers of membrane sheet; said permeate carrier layer being in direct fluid communication with the first set of openings of said central collection tube;
(c) at least one feed spacing layer providing feed spacing adjacent the at least one filtration envelope, wherein each of the at least one feed spacing layer contains feed spacing strips attached to a surface of the membrane sheet opposite the permeate carrier layer, said feed spacing strips are in continuous contact with adjacent membrane sheets in either the axial direction or the longitudinal direction, wherein each feed spacer extends above the surface to which it is attached by a height, and wherein the height of at least one of the feed spacing strips decreases from a first height distal from the first set of openings in the central collection tube to a second height, lesser than the first height, proximal to the first set of openings in the central collection tube.

17. A spiral wound membrane element comprising:
(a) a central collection tube having an axis and having a first set of openings along its length to receive permeate flow;
(b) at least one filtration envelope extending outwardly from and wound about said central collection tube, wherein each of said filtration envelopes comprise two layers of membrane sheet and a permeate carrier layer sandwiched between said layers of membrane sheet; said permeate carrier layer being in direct fluid communication with the first set of openings of said central collection tube;
(c) at least one feed spacing layer providing feed spacing adjacent to the at least one filtration envelope, wherein each of the at least one feed spacing layer contains feed spacing strips which extend along a first direction corresponding either to an axial direction parallel to the axis of said central collection tube or a longitudinal direction perpendicular to the axis of said central collection tube, wherein each of the feed spacing strips is separated from adjacent feed spacing strips by a smaller distance in the first direction than in a second direction perpendicular to the first direction.

18. The spiral wound membrane element of claim 17, wherein at least one of the feed spacing strips is consistent in thickness along its length.

19. The spiral wound element of claim 17, wherein each of the feed spacing strips has a thickness profile and wherein at least one of the feed spacing strips has a thickness profile is different from the thickness profile of another one of the feed spacing strips.

20. The spiral wound element of claim 17, wherein each of the feed spacing strips has a thickness profile and wherein at least one of the feed spacing strips has a thickness profile that reflects a nonconstant thickness of the corresponding feed spacing strip.

21. The spiral wound element of claim 17, wherein each of the feed spacing strips has a thickness profile and wherein at least one of the feed spacing strips is characterized by a path other than a straight line parallel to or perpendicular to the axis of the tube.

22. The spiral wound element of claim 17, wherein at least one of the feed spacing strips extends away from the at least one filtration envelope to which it is adjacent by a height, and wherein the height decreases from a first height distal from the first set of openings in the central collection tube to a second height, lesser than the first height, proximal to the first set of openings in the central collection tube.

23. The spiral wound membrane element of claim 17, wherein at least one of the feed spacing strips is consistent in thickness along its length.

\* \* \* \* \*